United States Patent [19]
Willey et al.

[11] Patent Number: 5,197,839
[45] Date of Patent: Mar. 30, 1993

[54] BLIND FASTENING APPARATUS

[75] Inventors: Norman F. Willey, Virginia Beach; James F. Linker, Hampton, both of Va.

[73] Assignee: The United States of America as represented by the United States National Aeronautics and Space Administration, Washington, D.C.

[21] Appl. No.: 743,485

[22] Filed: Aug. 8, 1991

[51] Int. Cl.[5] .................................... F16B 21/00
[52] U.S. Cl. .................................. 411/340; 411/103; 411/402
[58] Field of Search ............... 411/340, 341, 342, 344, 411/345, 346, 349, 169, 103, 104, 108, 999, 402, 407; 269/49; 29/264; 81/488

[56] References Cited

U.S. PATENT DOCUMENTS

| | | | |
|---|---|---|---|
| 1,506,123 | 8/1924 | Hubener | 411/103 |
| 2,273,648 | 2/1942 | Kost | 411/103 |
| 2,990,746 | 7/1961 | Stevens . | |
| 3,211,042 | 10/1965 | Fischer | 411/344 |
| 3,244,056 | 4/1966 | Kern | 411/340 |
| 3,332,118 | 7/1967 | Temple et al. . | |
| 3,377,729 | 4/1968 | Anderson | 411/103 X |
| 3,437,119 | 4/1969 | Dey | 411/349 |
| 3,473,431 | 10/1969 | King, Jr. . | |
| 3,605,547 | 9/1971 | Millet . | |
| 4,167,772 | 9/1979 | Baehne . | |
| 4,183,386 | 1/1980 | Brown | 411/176 |
| 4,348,140 | 9/1982 | Bergholz et al. | 411/103 |
| 4,650,386 | 3/1987 | McSherry et al. . | |
| 4,697,323 | 10/1987 | Sauvageau et al. | 29/264 |
| 4,971,502 | 11/1990 | Oh | 411/386 X |
| 5,044,854 | 9/1991 | Oh | 411/344 |

FOREIGN PATENT DOCUMENTS

| | | | |
|---|---|---|---|
| 391764 | 10/1990 | European Pat. Off. | 411/104 |
| 744157 | 6/1980 | U.S.S.R. | 411/103 |

Primary Examiner—Rodney M. Lindsey
Attorney, Agent, or Firm—Kevin B. Osborne

[57] ABSTRACT

An anchor nut insert is provided having external threads for engaging an internally threaded receptacle of a fixture to be installed. The fixture also has two wings flanking the receptacle and having fastener holes. An insert driver is provided having a projecting blade which engages a slot in the anchor nut insert for driving the insert. A guide member such as a wire passes through symmetry axes of the anchor nut insert and insert driver such that the anchor nut insert is located between the insert driver and a first terminal end of the guide wire. A swaged portion is provided on this terminal end to prevent the anchor nut insert and insert driver from sliding off the end. The fixture with the installed anchor nut insert is fed through a central hole in a structure wall having a blind side. The fixture is rotated until the wing holes are aligned with side holes in the wall and then the fixture is pulled flush against the blind side via the guide wire. Fasteners are then inserted through the hole and the anchor nut insert removed via the driver, exposing the fixed threaded receptacle for engagement as desired.

26 Claims, 5 Drawing Sheets

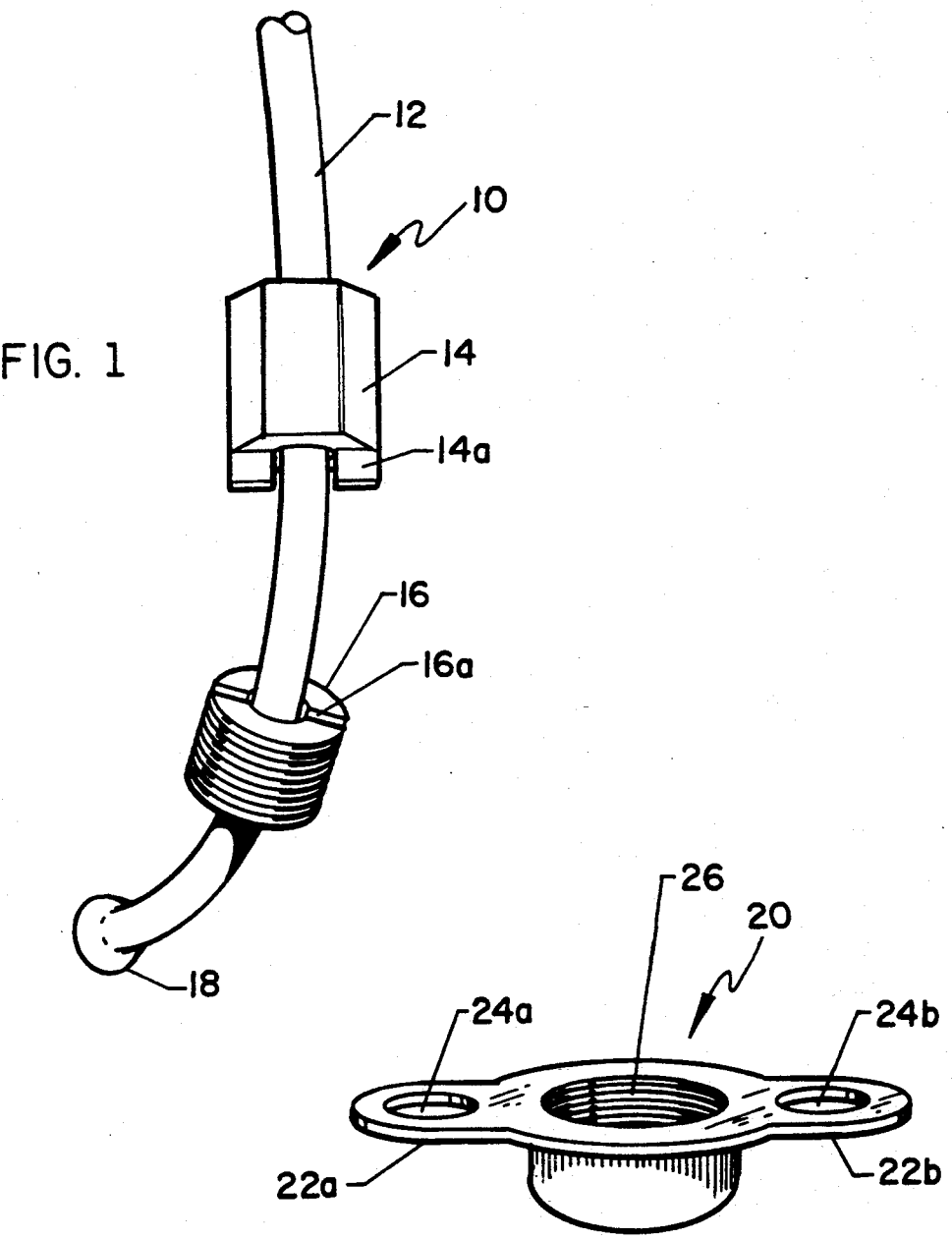

BLIND FASTENING APPARATUS

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

1. Technical Field of the Invention

The present invention relates generally to fasteners and more particularly to an apparatus for the blind installation of an anchor nut.

2. Discussion of the Related Art

It is often quite difficult to install a fixture into a blind and/or inaccessible area. For example, structure may be in place which blocks or limits access to a side of a wall area, thereby preventing any type of conventional nut/-bolt arrangement from being used wherein an anchor nut is provided as a threaded receptacle for another member. Extensive, time-consuming and possibly detrimental disassembly of the structure is often required to provide access to the blind side. In addition, several proposals using guide wires and similar guiding devices will result in a portion of the wire being cut and falling behind the inaccessible side of the wall. The presence of such waste is unacceptable in workplaces with clean environmental requirements such as aircraft and spacecraft manufacturing and repair. Also, the resulting torque parameters of the nut are often unacceptable.

OBJECTS OF THE INVENTION

It is accordingly an object of the present invention to provide for a blind installation of a fixed threaded receptacle.

It is another object of the present invention to accomplish the foregoing object without the production of detrimental waste.

It is a further object of the present invention to accomplish the foregoing objects while providing a fixed threaded receptacle which can withstand required torque parameters.

It is yet another object of the present invention to accomplish the foregoing objects simply and inexpensively.

It is a further object of the present invention to accomplish the foregoing objects with a mechanism which is adaptable to a wide variety of working conditions and requirements.

Additional objects and advantages of the present invention are apparent from the specification and drawings which follow.

SUMMARY OF THE INVENTION

The foregoing and additional objects are obtained by a blind fastening apparatus according to the present invention. An anchor nut insert is provided having external threads for engaging an internally threaded receptacle of an anchor nut fixture to be installed. The fixture also has two side wings flanking the receptacle. An insert driver is provided having a projecting blade which engages a slot in the anchor nut insert for driving the insert in and out of the threaded receptacle. A guide member such as a wire passes through symmetry axes of the anchor nut insert and insert driver such that the anchor nut insert is located between the insert driver and a first terminal end of the guide wire. A swaged portion is provided on this terminal end to prevent the anchor nut insert and insert driver from sliding off this end.

In a particular operation, the anchor nut insert is threaded into the threaded receptacle of the fixture via the insert driver. The other terminal end of the guide wire may be connected to a socket driver handle which engages the insert driver. The fixture if fed, one wing first, into a hole in a surface and then rotated until fastener holes located in the wings align with side holes in the surface. The fixture is then fastened to the surface via these holes and the insert driver nut is removed to expose the receptacle for subsequent engagement as desired.

BRIEF DESCRIPTION OF THE DRAWINGS

FIG. 1 is a perspective view of the blind fastening apparatus according to the present invention;

FIG. 2 is a perspective view of a fixture which is installed by the blind fastening apparatus;

DETAILED DESCRIPTION OF THE PREFERRED EMBODIMENT

Figure 3A:
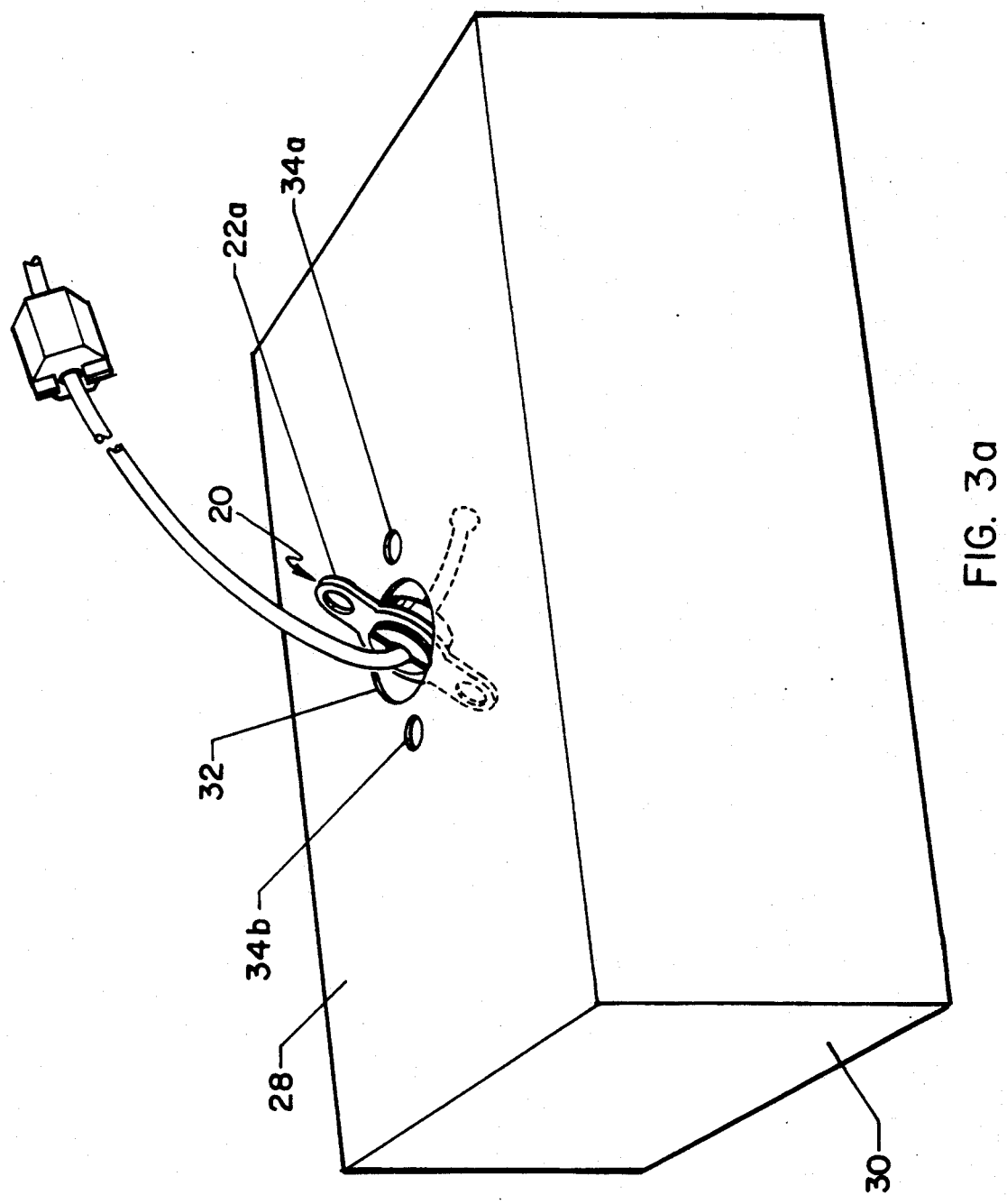
FIGS. 3a-3c are perspective views showing the installation of the fixture using the blind fastening apparatus.

Referring to FIG. 1, a blind fastening apparatus 10 is shown according to the present invention. A guide member 12 passes through the respective symmetry axes of an insert driver 14 and an externally threaded anchor nut insert 16 and has a ball swage 18 located on a terminal end to prevent the insert driver and anchor nut insert from sliding off this end. Guide member 12 may have any physical configuration so long as it performs the functions described below. For example, the guide member may be a guide wire having sufficient flexibility. Insert driver 14 had a projecting drive blade 14a on one end which is engageable with a slot 16a located in the end of anchor nut insert 16 facing this end of the driver.

Turning to FIG. 2, an anchor nut fixture 20 is shown which is installed by blind fastening apparatus 10. Anchor nut fixture 20 comprises two oppositely located symmetrical wings 22a and 22b having respective fastener holes 24a and 24b. An internally threaded receptacle 26 is provided in the center of anchor nut fixture 20 for threadingly engaging anchor nut insert 16 when driven by insert driver 14 such that wings 22a and 22b are located about the circumferential periphery of the receptacle.

Figure 3B:
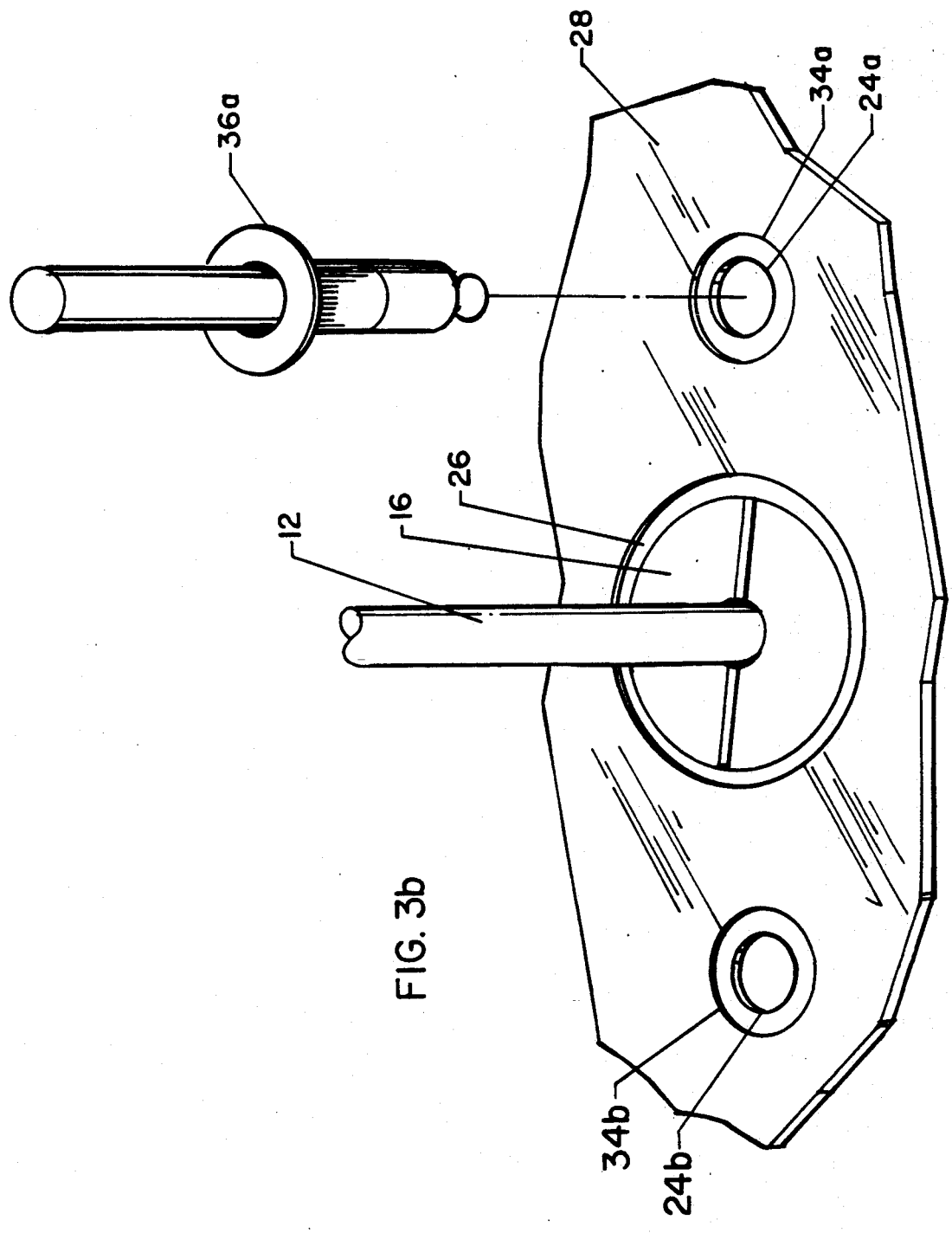
Figure 3C:
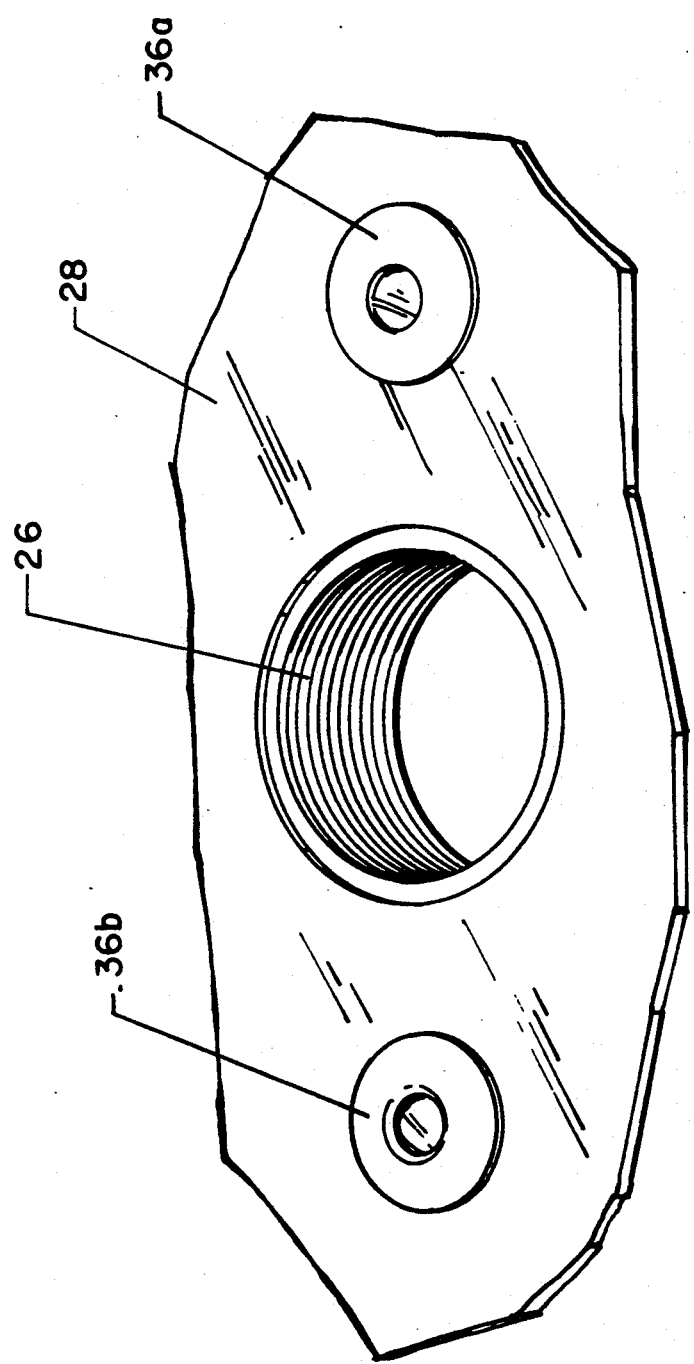

The installation of anchor nut 20 and anchor nut insert 16 into a wall 28 of a structure 30, e.g., a rectangular, closed box, is shown in FIGS. 3a-3c. Wall 28 has an accessible side and blind, inaccessible side blocked by the other walls of structure 30. As shown in FIG. 3a, a central through hole 32 is provided in wall 28 and is flanked by two respective symmetrically oriented side through holes 34a and 34b. Central hole 32 is cut large enough to receive anchor nut fixture 20 by first inserting one of the wings, e.g., wing 22b into central hole 32. During this insertion, the driver insert 14 is slid away from inserted anchor nut insert 16 and secured, e.g., held in the installer's hand. A sufficient portion of guide wire 12 is fed through insert 16 and fixture 20. The portion of guide wire 12 exterior to structure 20 is bent until it is approximately parallel with the uninserted wing 22a. Next, the remainder of anchor nut 20, i.e., receptacle 26 and wing 22a, is fed through central hole 32. The guide wire 12 is then released from its bent condition. Next, the guide wire 12 is tensioned away from wall 28 so that wings 22a and 22b of anchor nut 20 contact the inner surface, i.e., the blind side, of wall 28.

Anchor nut 20 is then rotated as necessary so that fastener holes 24a and 24b are respectively aligned with side holes 34a and 34b of wall 28. Proper positioning of side holes 34a and 34b may be ensured by the following: placing an anchor nut drill fixture on wall 28 so that center alignment pin is in central hold 32; guiding a drill through fixture hole to drill a side hole, rotate fixture 180° so that center alignment pin is in central hole 32; inserting side alignment pin into the underlying drilled side hole; guiding drill through fixture hole to drill other side hole; and removing the anchor nut drill fixture.

After the fastener and side holes are aligned, fixture 20 tightly contacts the blind side of wall 28 as the guide wire is tensioned. The fixture is then fastened to this blind side via appropriate fasteners 36a and 36b. For example, rivets such as blind rivets manufactured by Cherrymax ™ may be used as fasteners. When installing the appropriate fastener into the respective fastener hole and side hole, a clamp or other holding mechanism 36 such as a short fastener or short clamp manufactured by Kleco can be inserted into the other fastener hole and side hole. Once the rivets 34a and 34b are installed, anchor nut insert 16 is removed from fixture receptacle 26 via insert driver 14 to expose a fixed threaded receptacle for engagement as desired.

Accordingly, the present invention results in the installation of a threaded receptacle fixture simply and with relatively inexpensive components. No disassembly or destruction of the support structure is necessary. Also, no significant wastes are generated which could contaminate clean environments necessary in manufacturing of air- and spacecraft. In addition, the anchor nut fixture is securely fixed to the blind side to provide adequate torque.

Figure 5:
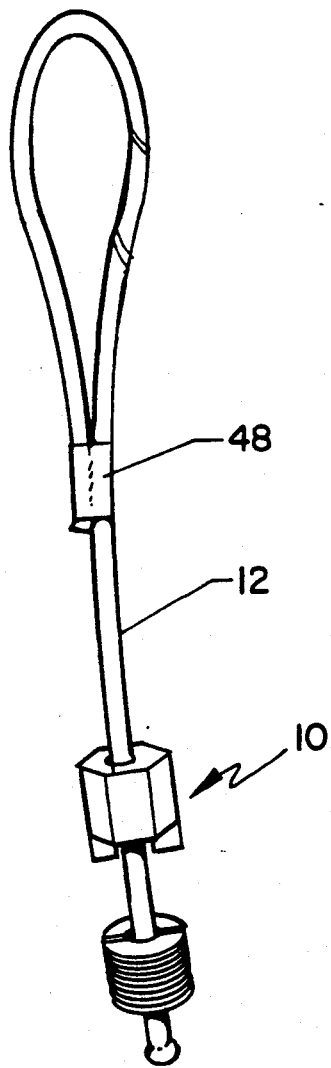
FIG. 5 is a perspective view of an embodiment of the present invention including a tether handle.
Figure 4:
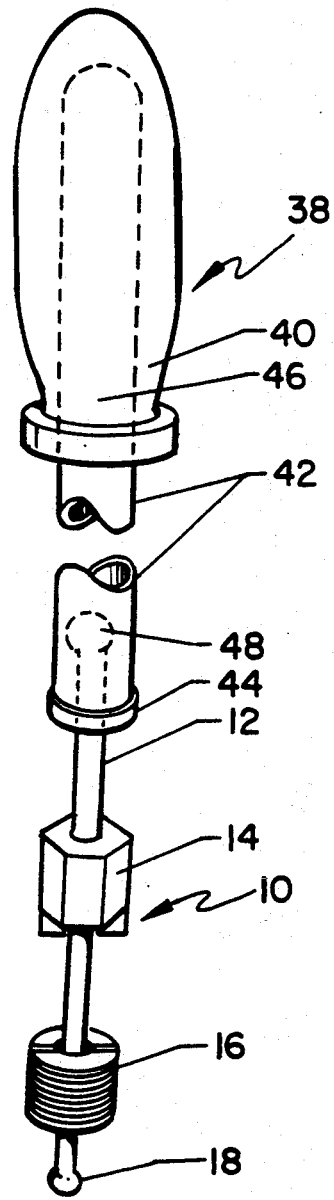
FIG. 4 is a perspective view of an embodiment of the present invention including a socket driver handle.

The driver insert 14 may be driven by any suitable mechanism such as an open end wrench. As shown in FIG. 4, a handle driver 38 may be provided. A handle 40 has an axial drive shaft 42 provided with an engaging socket driver 44 corresponding to the external shape of insert driver 14 for driving insert driver 14 into and out of threaded fixture receptacle 26. During this driving, guide wire 12 is pushed into an axial cavity 46 of axial driver 42. When extended, guide wire 12 remains connected to handle driver 42 via an appropriately sized swaged portion 48. Handle driver 38 can be a standard handle driver which is interchangeable with a wide variety of components such as screwdrivers, socket drivers, etc. as well as the blind fastening apparatus 10. For applications in aerospace manufacturing requiring tethering of tools to prevent damage to sensitive components from dropped tools, guide wire 12 can be expeditiously formed into a tether by passing the end opposite the blind fastening apparatus 10 through a swage 48, looping a portion of the guide wire passed therethrough, and folding this end back through the swag to form an adjustable tether loop, as shown in FIG. 5. This loop can be tethered to the clothing, such as a belt, or to the wrist of a worker.

Many modifications, improvements and substitutions will be apparent to one skilled in the art without departing from the spirit and scope of the present invention as described in the foregoing specification and drawings defined in the following claims.

What is claimed is:

1. A blind fastening apparatus for installing an anchor nut fixture with an internally threaded receptacle, the blind fastening apparatus comprising:

an anchor nut insert having external threads for engaging the internally threaded receptacle of the fixture;

an insert driver for driving said anchor nut insert to engage and disengage the internally threaded receptacle of the fixture, said insert driver and said anchor nut insert being discrete;

a guide member passing through said anchor nut insert and said insert driver, said guide member having first and second terminal ends, said anchor nut insert being located between said insert driver and the first terminal end of said guide member; and means for preventing said anchor nut insert and said insert driver from sliding off the first terminal end of said guide member.

2. The blind fastening apparatus according to claim 1, wherein said anchor nut insert has a slotted groove located on an end facing said insert driver and said insert driver has a projecting blade on an end facing said anchor nut insert engaging the slotted groove.

3. The blind fastening apparatus according to claim 1, wherein said preventing means comprises a swaged portion location at the first terminal end of said guide member.

4. The blind fastening apparatus according to claim 1, wherein said guide member is a guide wire.

5. The blind fastening apparatus according to claim 4, wherein the second terminal end of said guide wire is formed into a tether loop.

6. The blind fastening apparatus according to claim 1, further comprising a drive handle having a drive member which engages said insert driver to permit turning of said insert driver, said drive handle connected to the second terminal end of said guide member.

7. The blind fastener apparatus according to claim 6, wherein said drive member is a socket driver corresponding to the external shape of said insert driver.

8. The blind fastener apparatus according to claim 6, wherein said guide member is a guide wire, the second end of said guide wire is inserted into a hollow interior in said drive handle, and a handle swaged portion is connected to the guide wire second end, whereby said drive handle is connected to the guide wire second end.

9. The blind fastening apparatus according to claim 1, wherein said guide member passes through the symmetry axes of said anchor nut and said insert driver.

10. The blind fastening apparatus according to claim 1, further comprising a socket driver corresponding to the external shape of said insert drive, said guide member passing through said socket driver and said socket driver located between said insert driver and the second terminal end of said guide member.

11. The blind fastening apparatus according to claim 1, wherein said preventing means is sized to pass through the threaded receptacle of the anchor nut fixture.

12. A combination for providing an internally threaded receptacle in a structure wall having a blind, inaccessible side, the combination comprising:

a fixture element comprising a threaded central receptacle;

an anchor nut insert having external threads for engaging the internally threaded receptacle of the fixture;

an insert driver for driving said anchor nut insert to engage and disengage the internally threaded receptacle of said fixture, said insert driver and said anchor nut insert being discrete;

a guide member passing through said anchor nut insert and said insert driver, said guide member having first and second terminal ends, said anchor nut insert being located between said insert driver and the first terminal end of said guide member; and means for preventing said anchor nut insert and said insert driver from sliding off the first terminal end of said guide member.

13. The combination according to claim 12, wherein said anchor nut insert has a slotted groove located on an end facing said insert driver and said insert driver has a projecting blade on an end facing said anchor nut insert for engaging the slotted groove.

14. The combination according to claim 12, wherein said guide member is a guide wire.

15. The combination according to claim 14, wherein the second terminal end of said guide wire is formed into a tether loop.

16. The combination according to claim 12, wherein said preventing means comprises a swaged portion located at the first terminal end of said guide member.

17. The combination according to claim 12, further comprising a drive handle having a drive member which engages said insert driver to permit turning of said insert driver, said drive handle connected to the second terminal end of said guide member.

18. The combination according to claim 17, wherein said driver member is a socket driver corresponding to the external shape of said insert driver.

19. The combination according to claim 17, wherein said guide member is a guide wire, the second end of said guide wire is inserted into a hollow interior in said drive handle, and a handle swaged portion is connected to the guide wire second end, whereby said drive handle is connected to the guide wire terminal end.

20. The combination according to claim 12, wherein said guide member passes through the symmetry axes of said anchor nut and said insert driver.

21. The combination according to claim 12, wherein said fixture element further comprises two wings oppositely located on the periphery of the threaded receptacle, each wing having a fastener hole located therethrough.

22. The combination according to claim 21, further comprising fasteners for engaging the fastener holes located in the wings of said fixture element with the structure wall.

23. The combination according to claim 21, further comprising means for engaging the fastener holes located in the wings of said fixture element with the structure wall.

24. The combination according to claim 12, wherein said fixture element further comprises two wings oppositely located on the periphery of the threaded receptacle and further comprising a means for fastening the wings to the structure wall.

25. The combination according to claim 12, further comprising means for fastening the fixture element to the structure wall.

26. The blind fastening apparatus according to claim 12, wherein said preventing means is sized to pass through the threaded receptacle of the anchor nut fixture.

* * * * *